United States Patent [19]
Lessard et al.

[11] Patent Number: 5,302,253
[45] Date of Patent: Apr. 12, 1994

[54] ON-LINE ACID MONITOR AND NEUTRALIZER FEED CONTROL OF THE OVERHEAD WATER IN OIL REFINERIES

[75] Inventors: Ronald B. Lessard, Elmhurst, Ill.; Paul Fearnside, Sugar land, Tex.

[73] Assignee: Nalco Chemical Company, Naperville, Ill.

[21] Appl. No.: 867,890

[22] Filed: Apr. 13, 1992

[51] Int. Cl.[5] .............................. B01D 3/42
[52] U.S. Cl. ........................ 196/132; 202/160; 203/3; 210/96.1; 210/101; 210/143; 364/501; 422/62; 422/75; 422/76; 436/51
[58] Field of Search .............. 203/3; 210/743, 96.1, 210/101, 143, 266; 196/132; 422/62, 75, 76; 436/51, 55, 177; 202/160; 364/500, 501

[56] References Cited

U.S. PATENT DOCUMENTS

| | | | |
|---|---|---|---|
| 1,943,684 | 1/1934 | Martin et al. | 210/743 |
| 3,625,655 | 12/1971 | Culp et al. | 422/62 |
| 4,273,146 | 6/1981 | Johnson | 137/5 |
| 4,814,281 | 3/1989 | Byers | 422/62 |
| 5,047,125 | 9/1991 | Meier et al. | 208/DIG. 1 |
| 5,192,509 | 3/1993 | Surjaatmadja et al. | 422/75 |

OTHER PUBLICATIONS

J. Gutzeit, et al., Corrosion in Petroleum Refining and Petrochemical Operations (Metal handbook ninth edition, vol. 13, Corrosion), 1987 pp. 1262-1287.

Richmond & Browne, Automatic pH Control of Crude Column Overhead Streams Sponsored by the Nat. Assoc. of Corrosion Engineers, Mar. 22-26, 1982, Paper No. 102.

Bieber, Ferguson, Scattergood & Nalco Chemical Co., New Methods to Measure Corrosive Conditions Inside Crude Distillation Towers, Presented at the Nat. Assoc. of Corrosion Engineers, Apr. 23-27, 1990.

*Primary Examiner*—Peter A. Hruskoci
*Attorney, Agent, or Firm*—Arnold, White & Durkee

[57] ABSTRACT

A method and apparatus for automatically measuring the acidity of overhead water in an oil refinery, and dispensing a neutralizing agent into the refinery system at a rate responsive to that measurement. A sample of overhead water is collected and passed through a filter and cation exchange resin. The acid concentration of the sample is then automatically measured and a signal generated based on the concentration. The signal goes to a controller which controls the dispensation rate of neutralizing agent into the refinery system, thus reducing the acidity of the overhead water and limiting the corrosive effects of such acidity.

8 Claims, 2 Drawing Sheets

ON-LINE ACID MONITOR AND NEUTRALIZER FEED CONTROL OF THE OVERHEAD WATER IN OIL REFINERIES

BACKGROUND OF THE INVENTION

This invention relates to the monitoring and control of acid in the overhead water of oil refineries. Specifically, this invention constitutes an improved method for controlling these acids, by continually monitoring their concentration and by controlling the rate of introduction of neutralizing agent in response to this continually monitored concentration.

Corrosive aqueous acids are present in distillation towers used in petroleum refining. Water condenses at the "dew point" near the top of these distillation towers. Dissolved in this water are hydrochloric acid, organic acids, and various other acidic species, which rapidly corrode exposed areas in the vicinity of the dew point and points downstream.

Various methods have been suggested to remedy this corrosion. Generally, a neutralizing agent is introduced, either directly to the crude charge or injected at the top of the distillation tower. The quantity of neutralizing agent to be added is usually determined following some manual sampling and acid analysis of the tower condensate or of some other species. Because the time elapse between these manual analyses may span one or more days, excursions in the acid concentrations of the overhead water may occur. Because of the rapidity of acid corrosion, even a one day's unmonitored and uncontrolled excursion can have serious consequences.

Thus there is a need for a method of continually monitoring the acid concentration of overhead water, and of controlling the rate of introduction of neutralizing agent in a continuous manner, to avoid acid corrosion. One such system is described by Richmond and Browne in "Automatic pH Control of Crude Column Overhead Streams", presented at the International Corrosion Forum of March 1982. This system consists broadly of a sampling system, a pH cell, a neutralizer system, and a control system responsive to the measured pH. However, this system is vulnerable to cell fouling by hydrocarbon contamination during plant upsets, necessitating manual control during such upset, pending cleaning of the electrodes. Furthermore, a measurement of pH may underestimate the quantity of neutralizer required, due to the buffering effect of weak acids in the system. These and other problems are addressed in the present invention.

SUMMARY OF THE INVENTION

This invention presents a novel apparatus and method for monitoring and controlling the concentration of acid in the overhead water of oil refineries. Utilizing this invention, a sample of overhead water is collected either directly from the overhead line once the water has reached its dew point, or, preferably, from the aqueous phase of an accumulator which allows for separation of the water and hydrocarbons. The sample is then filtered to remove any remaining hydrocarbons, and optionally passed through a cation exchange resin to ensure that the collected sample has the same acidic concentration as that of the dew point condensate. The acidic concentration of the sample is then automatically measured and a signal generated which is responsive to the measured concentration. The signal is used to control the rate of dispensation of a neutralizing agent into the refinery system. The neutralizing agent can be introduced either into the crude oil charge, into the distillation tower, or directly into the overhead vapor line.

This invention also presents an apparatus for carrying out the above described method. A filter or filter/coalescer is placed in fluid communication with a collected sample of overhead water. If the filtered sample was collected from the accumulator, it is then passed through a cation exchange resin to restore the dew point acidity. The sample is then passed through a device which can detect the acidic concentration and generate a signal responsive to that concentration. The best device for this purpose is an automated titrator, but a pH meter, an optical detection system, or a conductivity measuring device could also be used. The acidic concentration detector then generates a signal which is sent to a controller. The controller responds to the signal to control the pump system which dispenses neutralizing agent into the system.

DETAILED DESCRIPTION OF THE INVENTION

Figure 1:
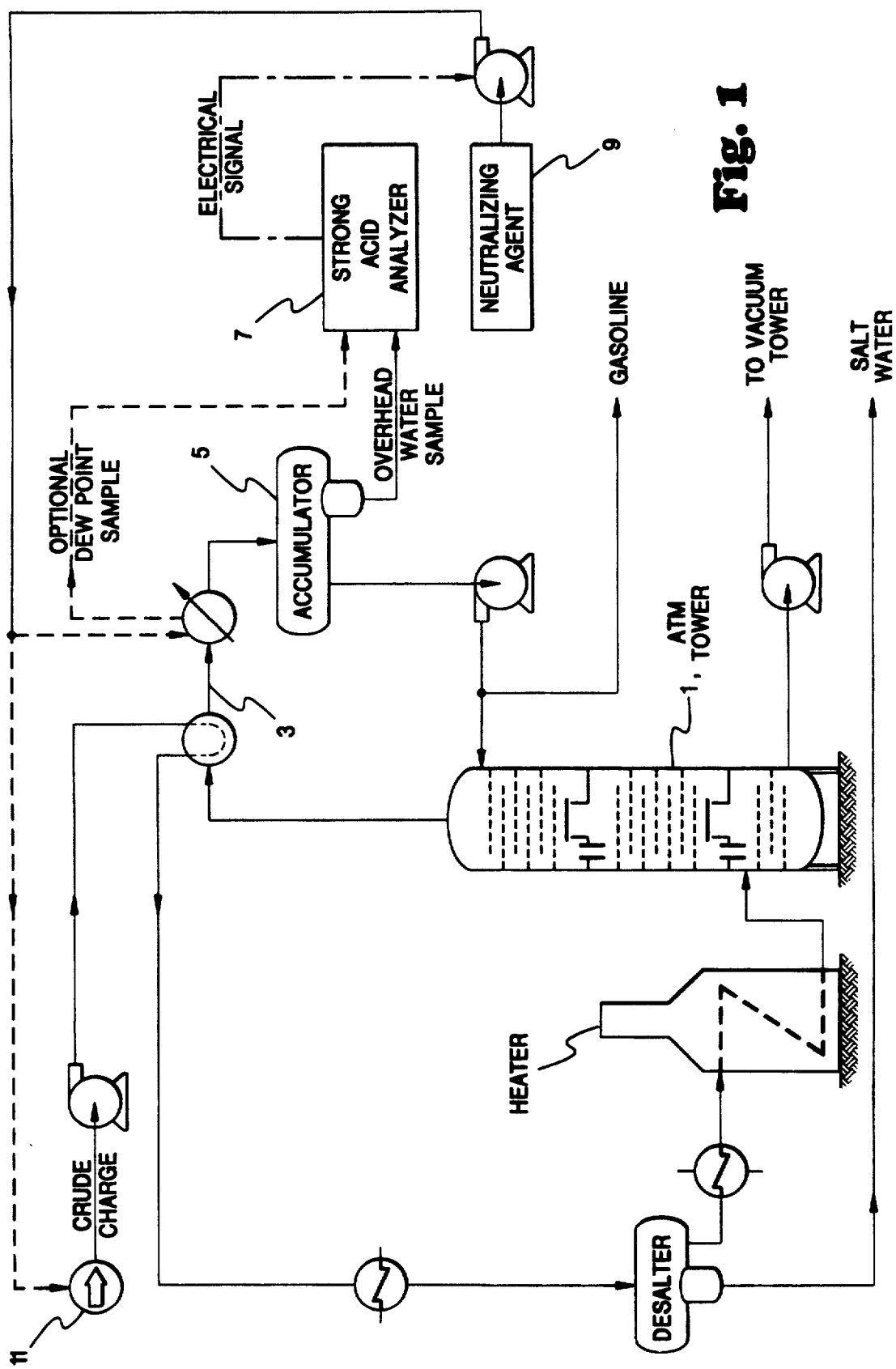
FIG. 1 is a schematic flow diagram of a typical refinery distillation tower showing how the acid analyzer and neutralizer dispenser are connected to the refinery system.

Following desalting, crude oil is processed in distillation columns (Block 1 in FIG. 1). The crude oil charge introduced to these columns contains water, organic acids, and the chemical precursors to various strongly acidic species. During the distillation process, water vapor rises to the top of the distillation column. This water is referred to as the "overhead water." At some point in the distillation tower, the water condenses. The temperature at which this condensation occurs is referred to as the "dew point."

Water condensed at the dew point is acidic. The primary source of this acid is hydrochloric acid generated from residual salt that was not removed during the desalting procedure. Generally, about 5% of the salt originally present will survive desalting. Hydrochloric acid may account for up to 95% of the total acid present. Other acidic species include sulfur acids and various organic acids, the latter of which occur naturally in the crude oil.

Corrosive dew point water in the top of distillation towers causes several problems. Corrosion damage to the tower trays can hinder temperature control and reduce distillation efficiency. Corrosion failure can occur in the column shell. Corrosion in pumparound or product draw pump seals, or in heat exchange and cooling systems, can cause leaks in these systems. Finally, entrainment of corrosion products in tower product draws can cause failures in downstream gas plants and hydrotreaters.

These acid corrosion problems can be reduced through the controlled addition of neutralizing agents. The neutralizing agents of the present invention may be introduced directly into the crude oil charge (11). Alternatively, they may be injected into a higher segment of the distillation tower, or into the overhead vapor line (3). The neutralizing agent of the present invention may be any conventionally chemical base typically used in the neutralization of acids. The preferred neutralizing agents are anhydrous ammonia, ammonium hydroxide, phosphates, and organic amines including, but not limited to, methylpropylamine, dimethylamine, morpholine, isopropylamine and monoethanolamine. Hydroxide and carbonate salts may also serve as neutralizing agents. The selection of an appropriate neutralizing agent, and of an appropriate concentration of such agent, are within the ordinary skill in the art.

The neutralizing agent is introduced to the system, whether injected into the crude oil charge, an upper segment of the distillation column, or the overhead vapor line, by a neutralizer dispenser (9). The neutralizer dispenser may be any system known in the art suitable for the controlled introduction of neutralizing agent into the distillation system. A suitable neutralizing dispenser can be selected from any of several commercially available positive displacement pumps. Examples of some suitable pumps in current uses include Williams Air Pumps, Milton Roy Positive Displacement Pumps, Crane Positive Displacement Pumps, and Stanmar Positive Displacement Pumps. These pumps may all be used in conjunction with suitable acid measuring devices.

The neutralizer dispenser may consist of one or more pumps. In a "one pump" mode of operation, a pump is used that would allow a microprocessor to adjust the flow rate of neutralizing agent in response to the measured acid concentration. In a "two pump" mode of operation, a first pump introduces neutralizing agent at a constant rate. The second pump is activated whenever the measured acid concentration exceeds the neutralizing agent introduced by the first pump, and deactivated once the acid concentration is reduced to an acceptable level.

Figure 2:
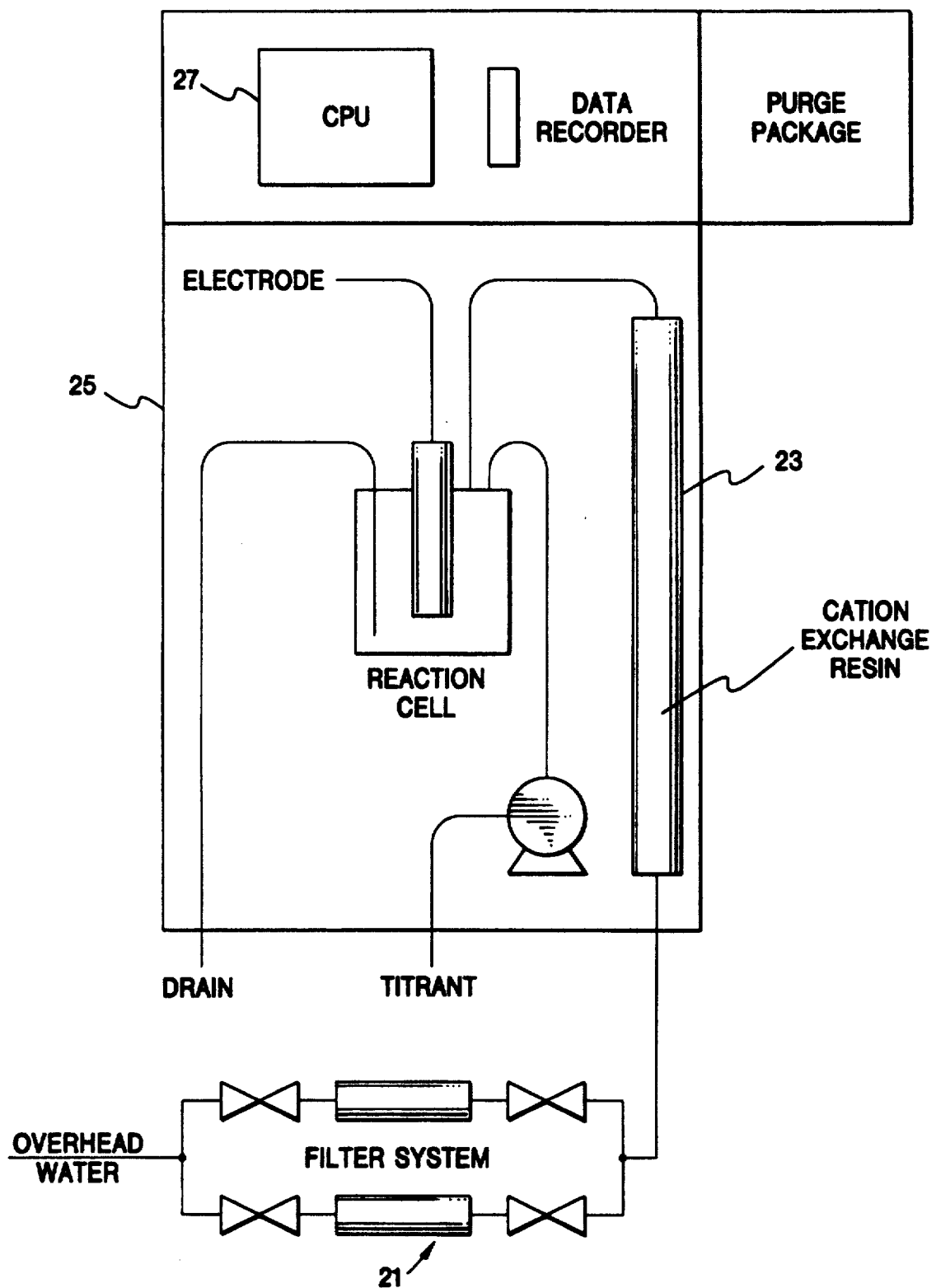
FIG. 2 is a diagram of the acid analyzer system showing the filter, cation exchange resin and automatic titration system.

The neutralizer dispenser of this invention is operationally connected to a dispenser controller (Block 27 FIG. 2). The dispenser controller may be a microcomputer, a central processing unit, or any other similar device capable of processing the signal output from the acid measurement device and controlling the rate of dispensation of neutralizing agent in response to this signal. The dispenser controller may be integral with the neutralizing dispenser or it may be separate. Suitable dispenser controllers would include any one of a number of control systems that are well known in the art. A particularly suitable dispenser controller is the microprocessor in the Tytronics FPA 301 analyzer, which was designed for pH control applications.

The acid concentration detector (25) of this invention may be any one of a number of devices capable of generating a signal responsive to the concentration of acid in the overhead water. Specifically, it measures some property that may be correlated with the concentration of acid. Thus reference in the claims to the acid concentration detector "measuring the concentration of acid" references measurement of any property that can be correlated to this concentration. A standard pH electrode would be one such device; alternatively, one may measure the conductivity of an overhead water sample, or detect the color change in an acid/base indicator.

Automated titrators are a particularly effective acid measuring means for use in this invention. These devices more accurately measure acid concentration, and are less sensitive to individual plant factors than an ordinary pH meter. They are also less sensitive to buffering effects. The automated titrator conducts a titration of the overhead water sample, to a predetermined end point, with an aqueous base. Titration to pH 4.8 has proven useful in the practice of this invention, but titrating to other values is possible, depending on the system. Any suitable base may be used; sodium or potassium hydroxide are preferred. The titration end point may be detected using a pH electrode. Alternatively, one may use an acid-base indicator, with the resulting color change detected by a photodiode. The end point might also be detected by measuring changes in conductivity through the titration. The automated titrator generates a signal responsive to the concentration of acid present in the sample of overhead water. A number of automated titrators suitable for use in this invention are commercially available. These include, but are not limited to, the FPA 301 product of Tytronics, Inc., the DigiChem 3000 Analyzer by Ionics, Inc., the AnaChem 2000 product of FPM Analytics, and the FPA 400 and 800 devices made by Tytronics. All of these products are designed for on-line, rather than laboratory bench top, applications. The Tytronics FPA 301 device has proved especially suitable for this application.

A sample of the overhead water is collected for analysis by the acid concentration detector. It is possible to sample the overhead water directly from the dew point region by placing a direct line from the overhead to the analyzer. However, drawing the sample from the accumulator (5) is preferred. The hydrocarbons and the water separate in the accumulator, and the sample can be drawn from the heavier aqueous phase. This reduces the quantity of hydrocarbon that must be removed by the filter or filter/coalescer. Furthermore, larger samples can be collected in a shorter time period than by direct sampling at the dew point.

The water sample is passed through a filter or filter/coalescer (21) before it is analyzed by the acid measuring device. The filter/coalescer removes any hydrocarbon contaminants. Any dew point sample of overhead water from a distillation tower will be contaminated by hydrocarbons and other organic material; a sample from the accumulator would be less contaminated. These contaminants foul the pH electrode or other detection systems of the acid measuring device, disrupting control of the introduction of neutralizing agents. The filter should be capable of withstanding the conditions of the sample stream. A suitable filter is available from the Cole-Parmer Instrument Company. It consists of a 304 stainless steel housing and a progressive density, glass-cellulose matrix. Alternatively, a filter/coalescer system may be used. Suitable commercial products are produced by Precision Scientific and Perma Pure.

The sample may also be passed through a cation exchange resin (23) before it is analyzed by the acid concentration detector. A sample collected from the accumulator has been neutralized; the ion exchange resin converts the neutralized sample back into a form that has the same, or close to the same, acid concentration as that of the dew point condensate. The ion exchange resin should be a strongly acidic cation exchange resin. One suitable commercial product is Amberlite IRN-77, a styrene based cation exchange resin sold by Rohm and Haas. If the sample is taken directly from the dew point, it may not be necessary to pass it through an ion exchange resin.

The operation of this invention is further illustrated by the following example: Water was drawn from the aqueous phase of an accumulator in actual use in a refinery. This water sample was taken into a lab and pumped through the acid analyzer system described herein for a comparison of the analyzer system against the current method of manual titration. The overhead water passed through a filter/coalescer, then a cation exchange resin, and then into a Tytronics FPA 301 Automated Titrator.

| Results from Analyzer: | |
| --- | --- |
| Titration frequency | 1 analysis every 10 min. |
| Titration volume | 160 mls. |
| Acid Concentration range (25 readings) | 286–300 ppm as HCl |
| Results from Manual Titration: | |
| Two manual readings for acidic concentration | 281 and 304 ppm as HCl |

Utilizing these results, the Analyzer would send a signal responsive to the concentration readings to the neutralizer dispenser every 10 minutes. The neutralizer dispenser would then change the volume of neutralizing agent introduced into the system, if necessary, based on the specifics of that system. The current method of manual titration would result in changes made to the neutralizer volumes only when the overhead water is checked manually, which is usually only a few times per week. The two manual readings shown were taken from the same sample and yielded much different results. The fact that manual titration can yield various readings from the same sample results in making changes to the volume of neutralizing agent introduced into the system which may not be truly responsive to the varying acid concentration in the overhead water.

While changes in the sequence of steps and in the components of the invention herein described may be made by those skilled in the art, such changes are included within the spirit of this invention as defined by the appended claims.

What is claimed is:

1. An apparatus for controlling the acidity of overhead water in an oil refinery which includes a crude oil charge, and a distillation tower having an overhead vapor line which produces a dew point condensate, comprising:
   a means for collecting a sample of said dew point condensate;
   an automated titrator in fluid communication with said sample, said automated titrator being capable of detecting the concentration of acids in said sample and generating a signal responsive to the detected concentration of acids;
   a neutralizer dispenser arranged to dispense a neutralizing agent into the crude oil charge or overhead vapor line of the oil refinery at variable rates; and
   a dispenser controller operationally connected to said automated titrator and to said neutralizer dispenser, said controller being capable of responding to said signal generated by said automated titrator to control the dispensing rate of said dispenser.

2. The apparatus in claim 1, further comprising: a filter or filter/coalescer in fluid communication with said sample for removing hydrocarbon contaminants said filter or filter/coalescer being disposed upstream from said automated titrator.

3. The apparatus in claim 2, further comprising: a cation exchange resin in fluid communication with said sample for converting the acid concentration of said sample to about the acid concentration of said dew point condensate, said cation exchange resin being disposed upstream from said automated titrator and downstream from said filter or filter/coalescer.

4. The apparatus of claim 1 wherein the automated titrator has a titration endpoint pH of about 4.8.

5. The apparatus of claim 1 wherein the automated titrator includes a titration endpoint detector comprising a pH electrode, an optical detection system, or a conductivity measuring device.

6. An apparatus for controlling the acidity of overhead water in an oil refinery which includes a crude oil charge, and a distillation tower having an overhead vapor line which produces a dew point condensate, comprising:
   a filter or filter/coalescer in fluid communication with said overhead water for removing hydrocarbon contaminants;
   a cation exchange resin in fluid communication with said overhead water for converting the acid concentration of said overhead water to about the acid concentration of said dew point condensate;
   an automated titrator in fluid communication with said overhead water and downstream from said filter/coalescer and said ion exchange resin, said automated titrator being capable of detecting the concentration of acids in said overhead water and generating a signal responsive to the detected concentration of acids;
   a neutralizer dispenser arranged to dispense a neutralizing agent into the crude oil charge or overhead vapor line of the oil refinery at variable rates; and
   a dispenser controller operationally connected to said automated titrator and to said neutralizer dispenser, said controller being capable of responding to said signal generated by said automated titrator to control the dispensing rate of said dispenser.

7. The apparatus of claim 6 wherein the automated titrator has a titration endpoint pH of about 4.8.

8. The apparatus of claim 6 wherein the automated titrator includes a titration endpoint detector comprising a pH electrode, an optical detection system, or a conductivity measuring device.

* * * * *